United States Patent
Matsuo et al.

(10) Patent No.: US 7,653,357 B2
(45) Date of Patent: Jan. 26, 2010

(54) ACCESS POINT INTERFERENCE CONTROL AND SELECTION METHODS

(75) Inventors: Ryoko Matsuo, Tokyo (JP); Shuichi Obayashi, Yokohama (JP); Toshikazu Kodama, Morristown, NJ (US); Dave Famolari, Stewartsville, NJ (US); Praveen Gopalakrishnan, Somerville, NJ (US); Faramak Vakil, Long Grove, IL (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 145 days.

(21) Appl. No.: 11/419,625

(22) Filed: May 22, 2006

(65) Prior Publication Data
US 2007/0060057 A1 Mar. 15, 2007

Related U.S. Application Data

(60) Provisional application No. 60/710,355, filed on Aug. 22, 2005.

(51) Int. Cl.
*H01B 1/00* (2006.01)
(52) U.S. Cl. ....................................... 455/69
(58) Field of Classification Search ................. 342/159; 455/69
See application file for complete search history.

(56) References Cited

U.S. PATENT DOCUMENTS 6,697,013 B2 * 2/2004 McFarland et al. .......... 342/159
6,907,229 B2 * 6/2005 Shpak ......................... 455/69
2002/0168993 A1 11/2002 Choi et al.

OTHER PUBLICATIONS

IEEE STD. 802.11h-2003: Specrum and Transmit Power Management Extensions in the 5 GHz Band in Europe, in: Get IEEE 802 (On Line, <URL: http://standards.ieee.org/getieee802/802.11.html>, Oct. 14, 2003.
Jayne Stancavage "Wi-Fi Popularity Extends to 5 GHz," in: Electronic Design: The Tool for Architecting the Unwired World, (On Line, <URL: http://www.wsdmag.com/Articles/ArticleID/7915/7915.html>) Apr. 1, 2004.

* cited by examiner

*Primary Examiner*—Evan Pert
(74) *Attorney, Agent, or Firm*—Watchstone P+D, PLLC

(57) ABSTRACT

In some embodiments, a system and method is disclosed for, among other things, reducing interference in a first wireless network from a second wireless network. In some embodiments, the method includes that an Interfered AP, which Interfered AP either itself receives interference or has a station in the Interfered AP's network that receives interference from an Interfering AP or from a station within the Interfering AP's network, selects how to reduce interference from a plurality of interference reduction methods—e.g., including transmit power control (TPC), channel switching (CS) and/or the like.

20 Claims, 14 Drawing Sheets

Overview of Control Flow for Interference Reduction

Figure 1: Overview of Control Flow for Interference Reduction

Figure 2: Block Structure of Step (i)

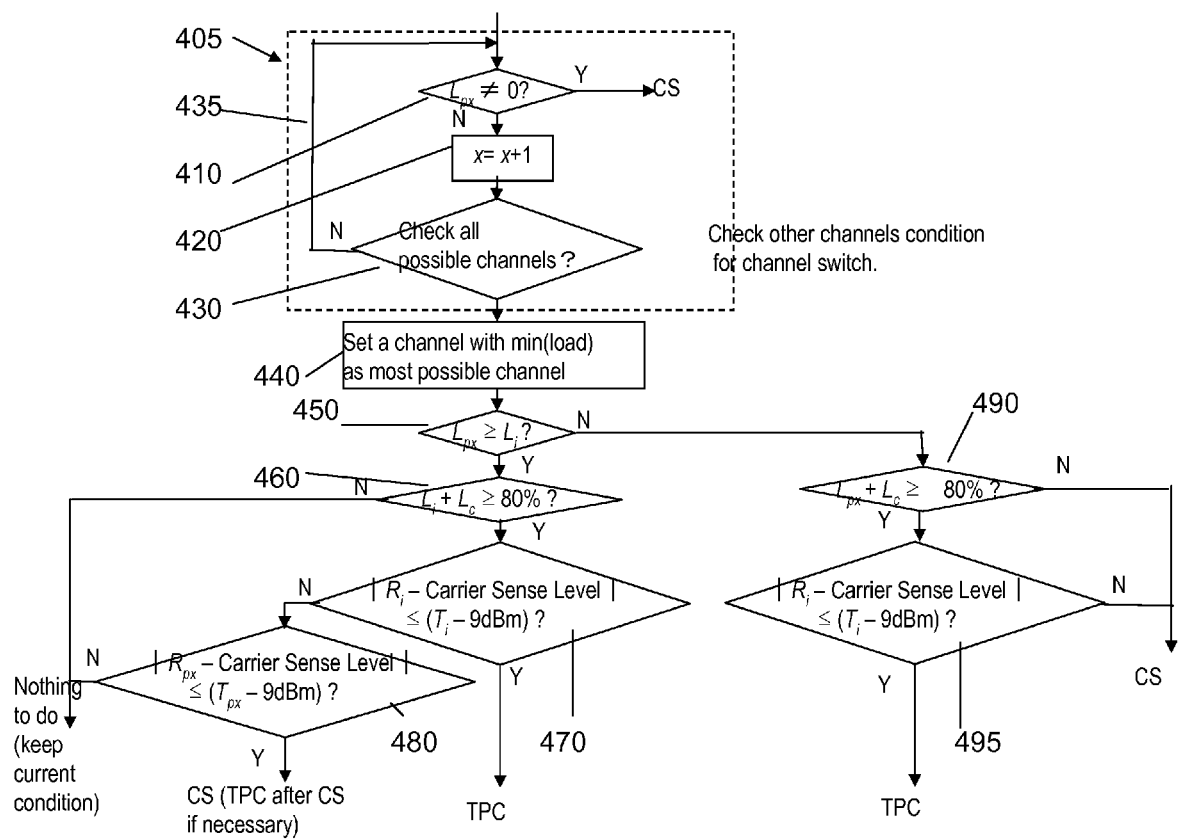
Figure 4: Basic Selection Flow ((i)-policy 1-a))

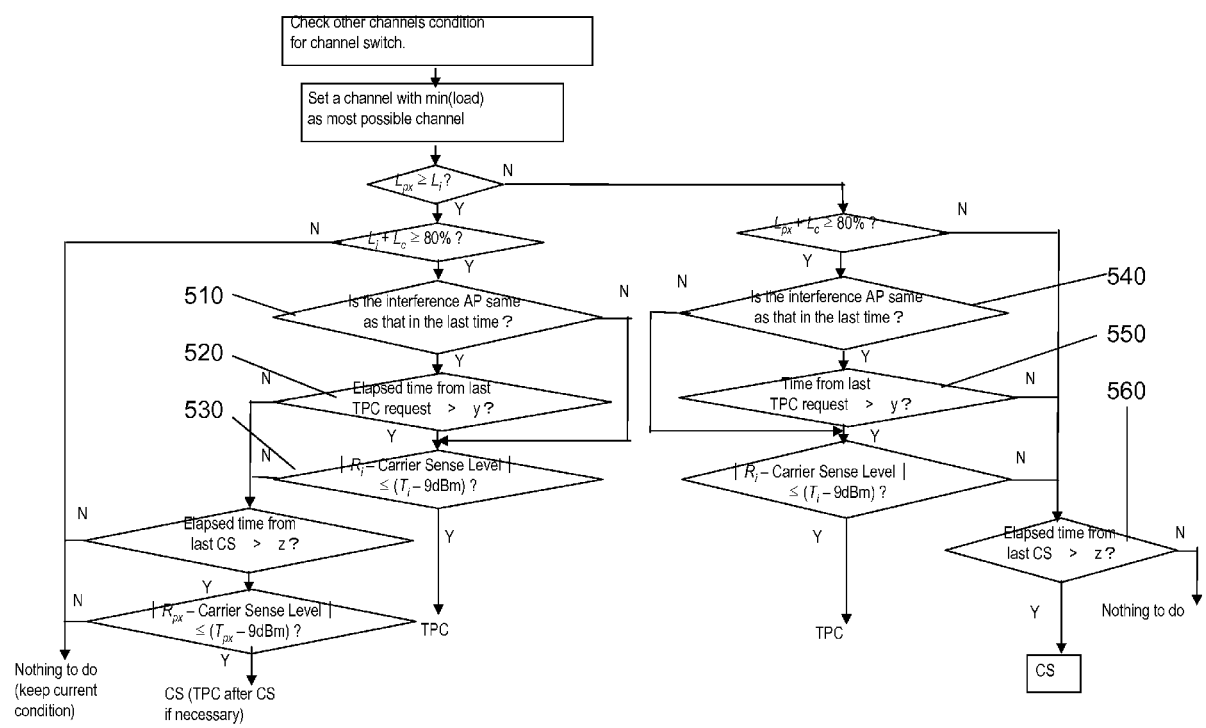
Figure 5: Advanced Selection Flow to Avoid an Endless Control Loop ((i)-policy1-b)

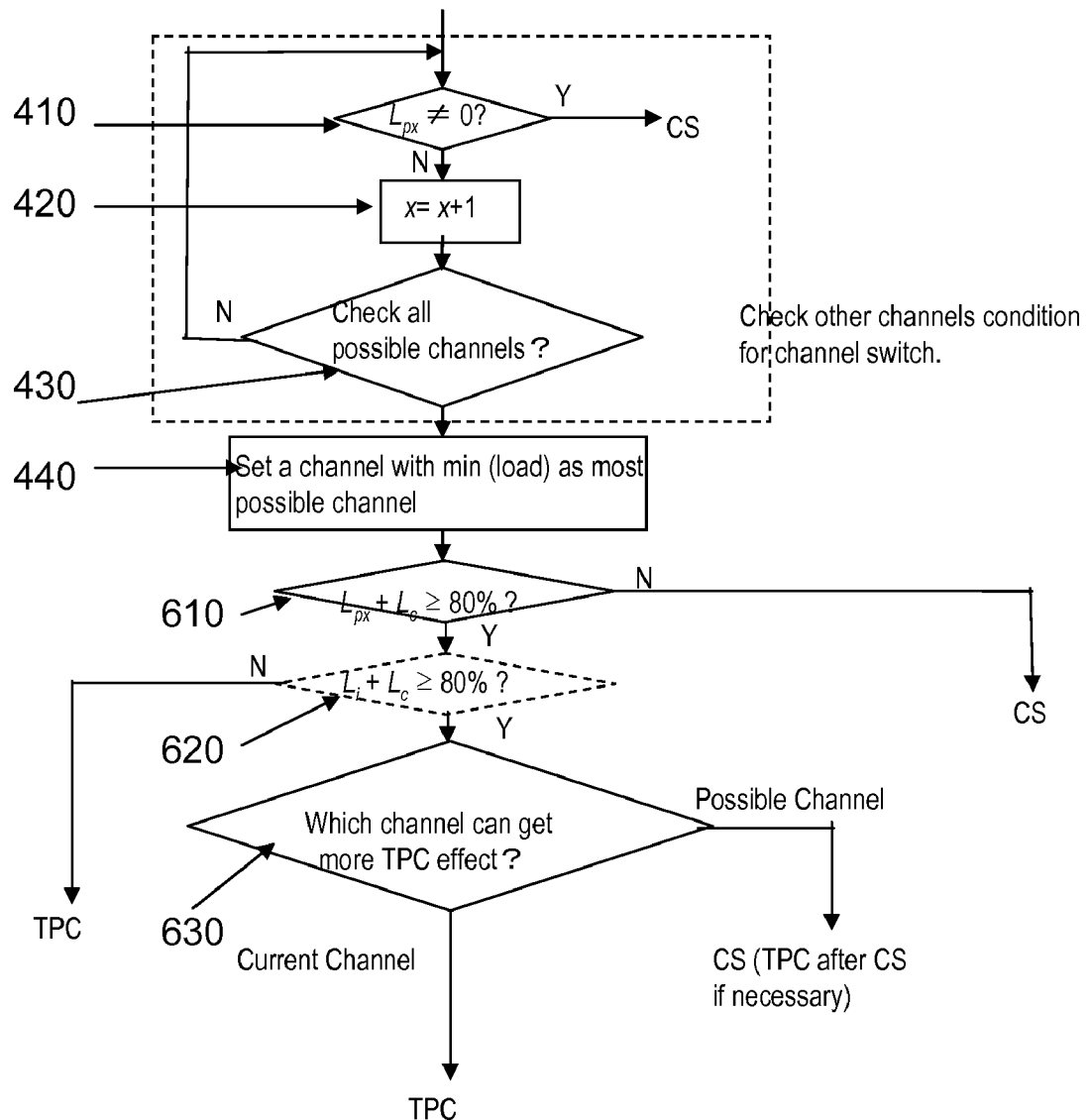
Figure 6: Selection Flow of CS->TPC ((i)-policy1-c)

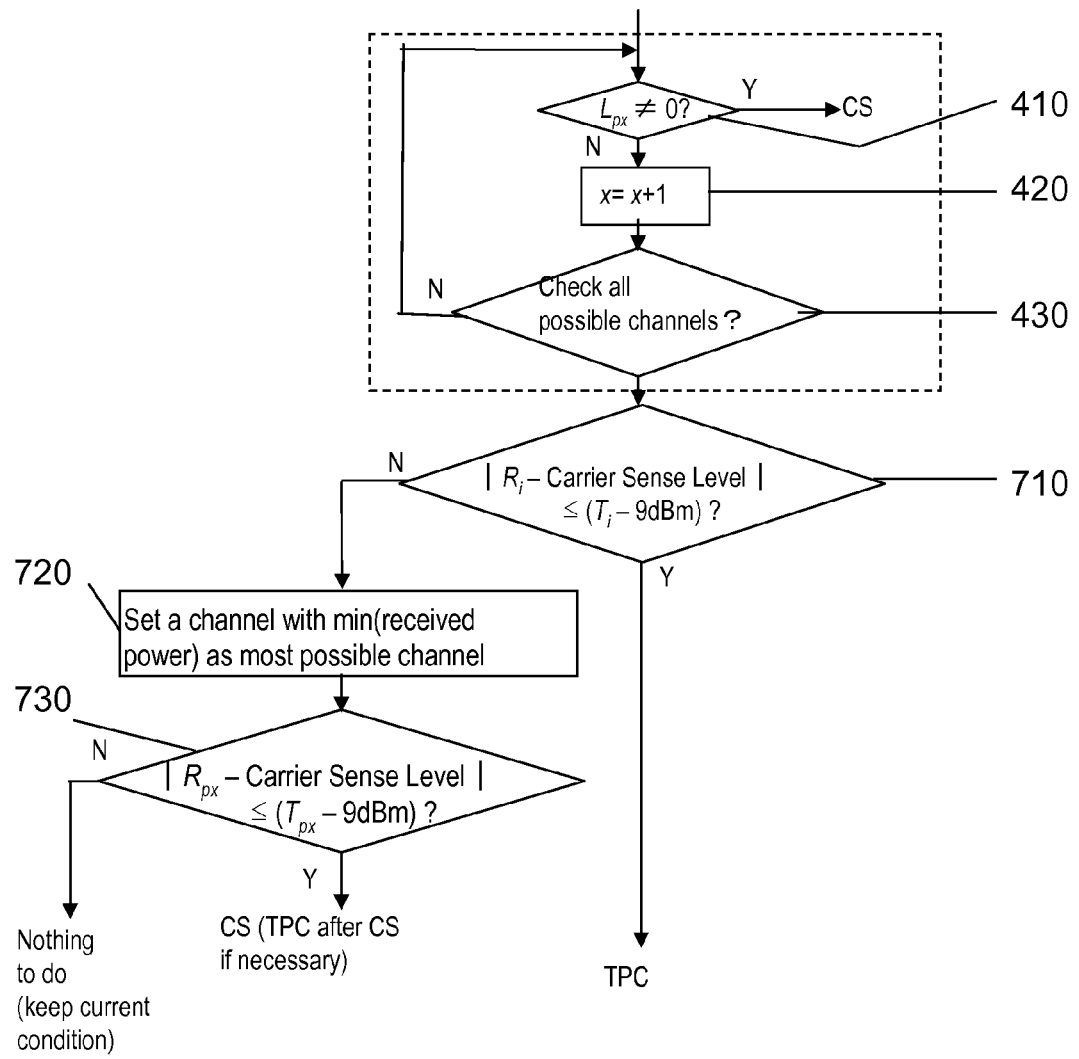
Figure 7: Selection Flow with Policy 2 ((i)-policy2-a)

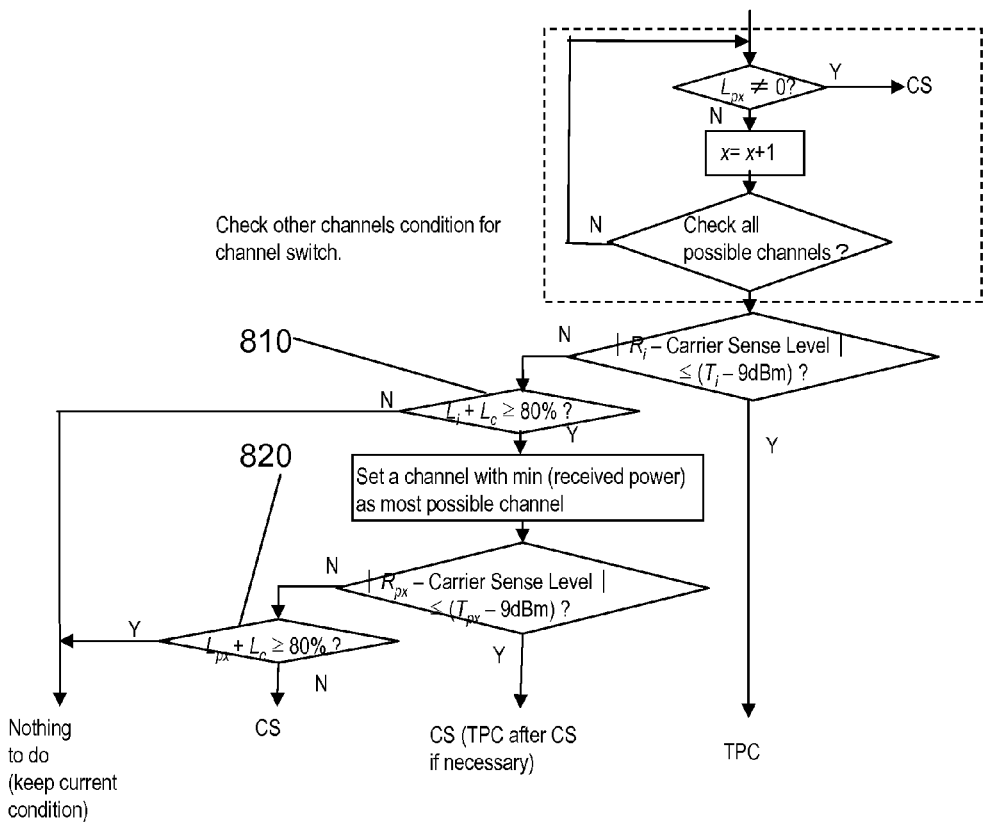
Figure 8: Advanced Selection Flow with Policy 2 ((i)-policy2-b)

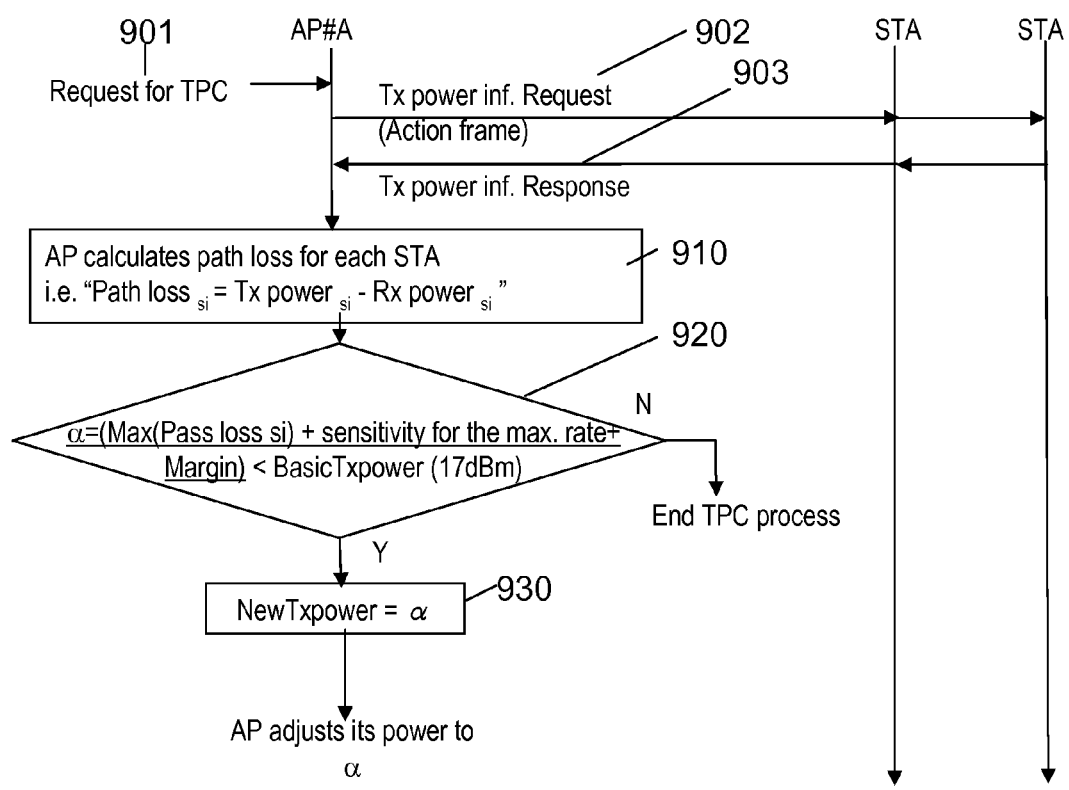
Figure 9: Flow Chart (First Step of TPC Method of AP, (iii)-a)

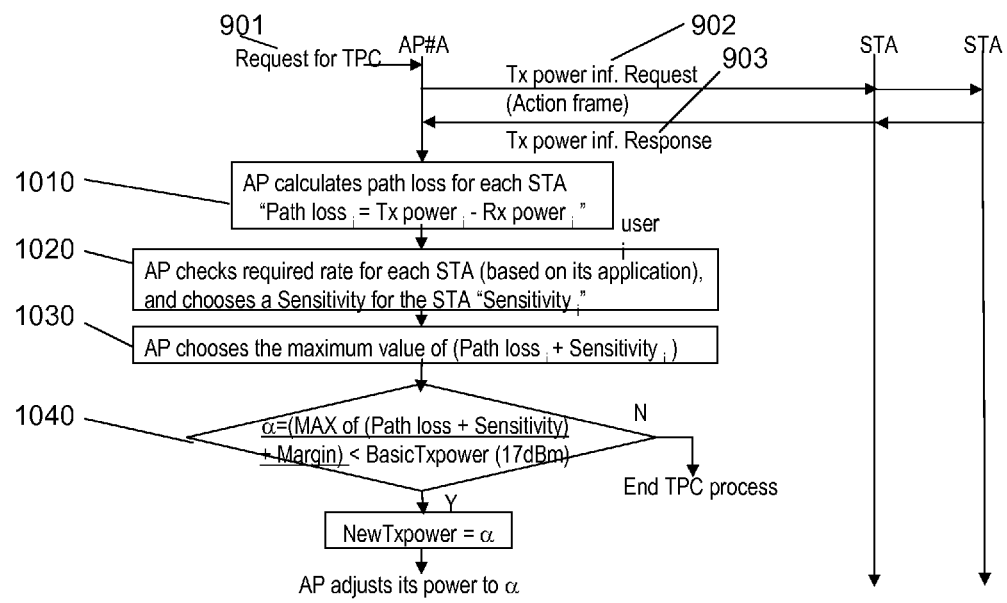
Figure 10: Advanced Flow Chart (First Step of TPC Method of AP, (iii)-b)

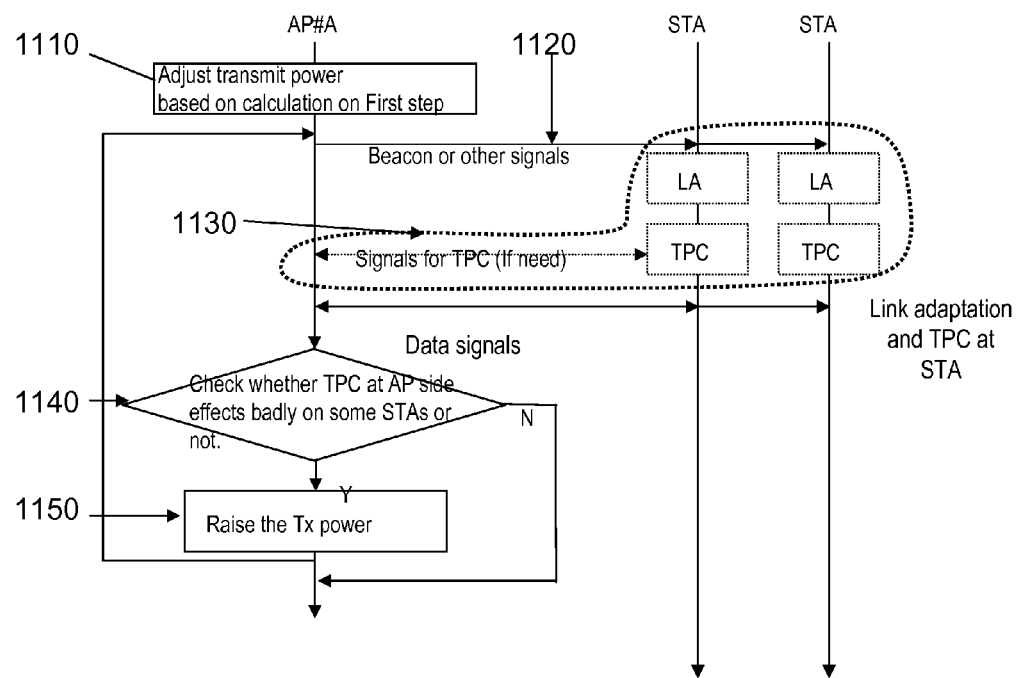
Figure 11: Flow Chart of the Second Step of TPC Method of AP (iv)

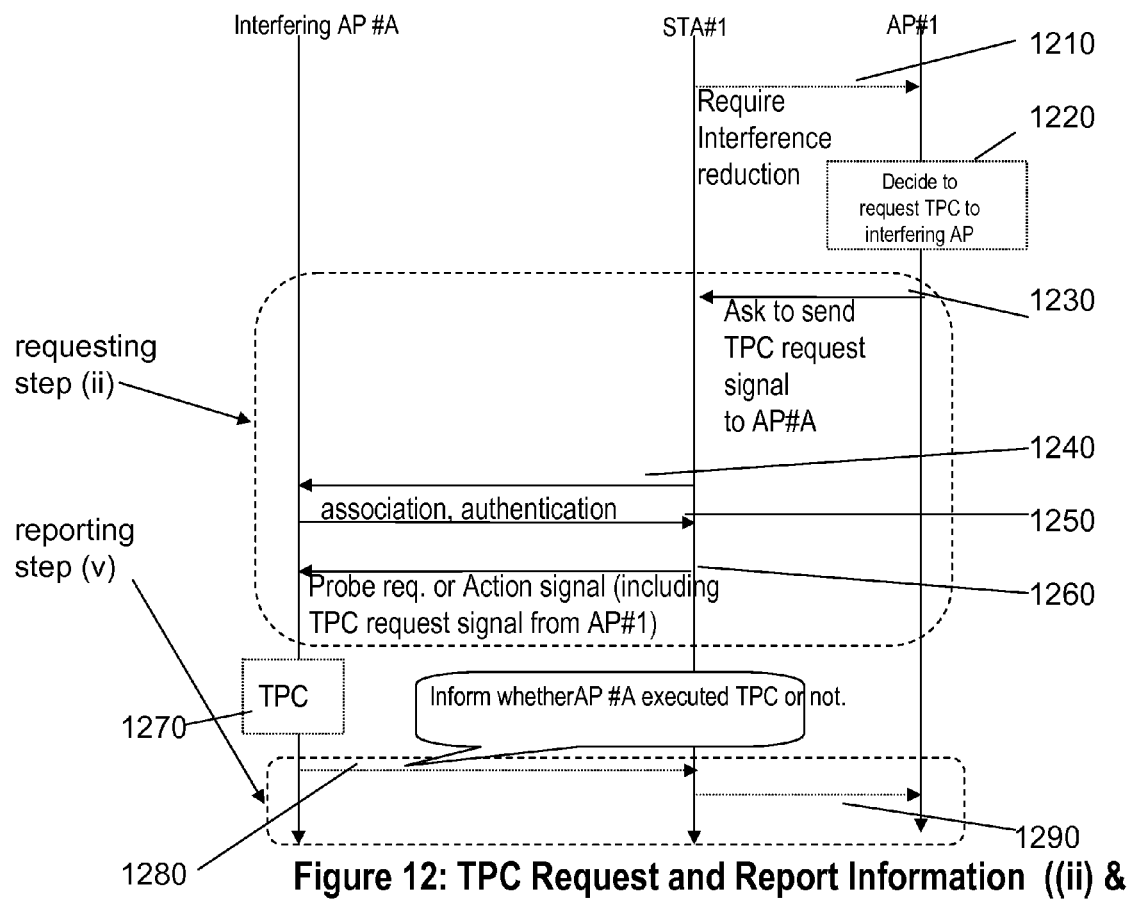
Figure 12: TPC Request and Report Information ((ii) &(v))

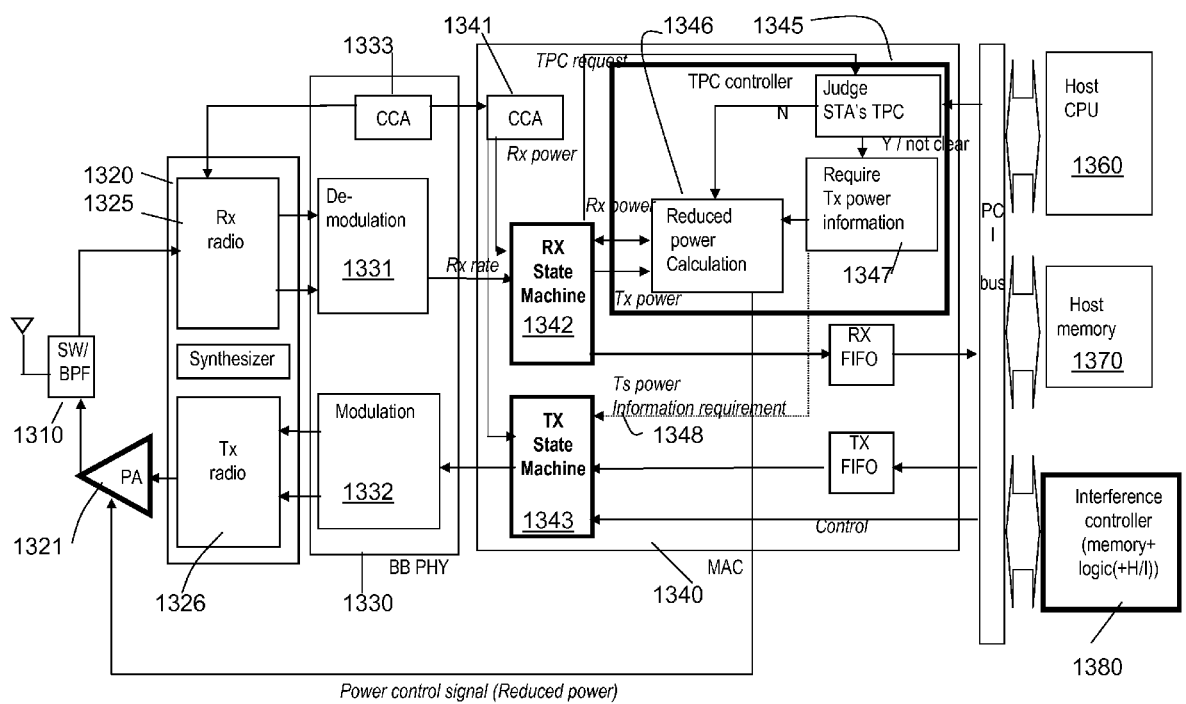
Figure 13: Block Diagram of AP for TPC

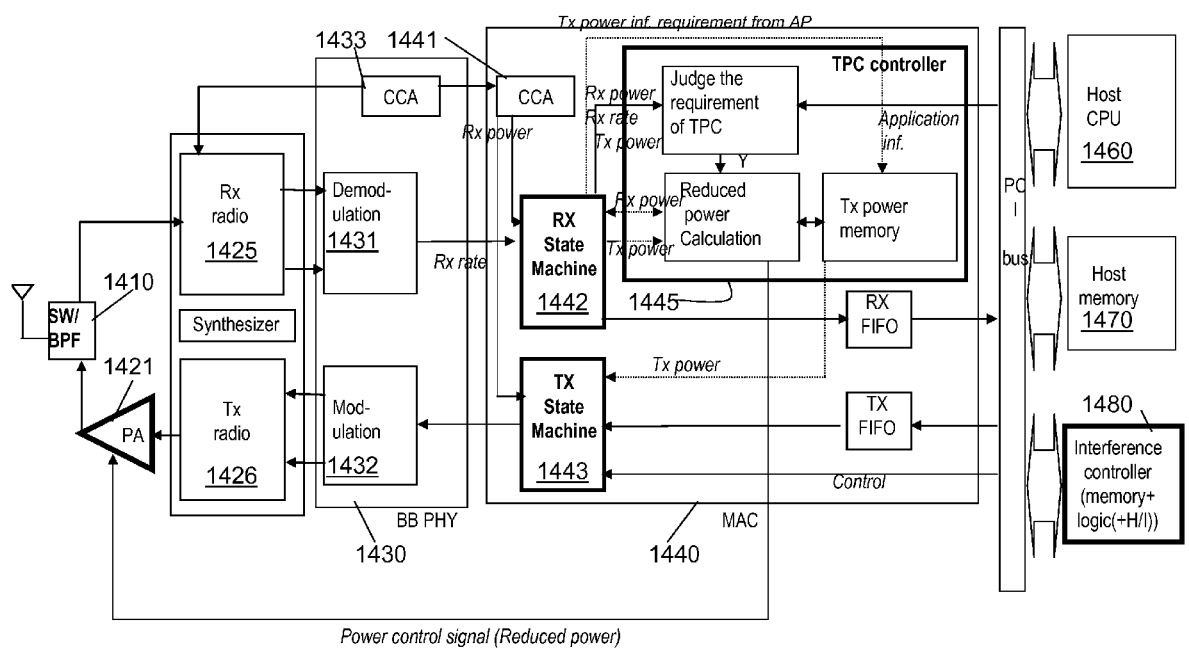
Figure 14: Block Diagram of STA for TPC

ACCESS POINT INTERFERENCE CONTROL AND SELECTION METHODS

The present application claims priority to U.S. Provisional Application Ser. No. 60/710,355, filed on Aug. 22, 2005, to R. Matsuo, et al., entitled Access Point Transmit Power Control (TPC) and Selection Method Among Channel Switch (CS) and TPC, the entire disclosure of which is incorporated herein by reference.

BACKGROUND

1. Field of the Invention

The present application relates to wireless networking and, in some preferred embodiments, to methods of addressing interference from other access points, stations and/or devices.

2. General Background Discussion

A. Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that identifies the host device's point of attachment to the IP networks.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer.

B. Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANs) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two or more independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), typically, routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

D. Interference from Other Devices

The tremendous growth of wireless communications and the broad deployment of the Internet have brought major changes in the field of Local Area Networks. For example, Wireless Local Area Networks (WLANs) have already acquired popularity, such as, e.g., IEEE-802.11-standard-based WLAN systems which are rapidly becoming more-and-more widely used.

However, with the expanding deployments of WLAN systems are the substantial issues related to co-channel interference.

So far, 802.11h seeks to address these interference issues in the use of 802.11a systems in some locations to enable its coexistence with, in particular, military radar systems and medical devices. In this regard, two schemes are used to reduce interference: (1) Dynamic Frequency Selection (DFS) and (2) Transmit Power Control (TPC). In this application, DFS is encompassed under the terminology Channel Switch" (CS), wherein CS preferably includes the detection of the presence of other devices on a channel and the automatic switching to another channel. On the other hand, TPC involves, e.g., the reduction of the transmit power. However, 802.11h is mainly specified to reduce interference to radar; and, TPC is essentially for preventive measures against radar. Thus, the mechanism of TPC defined in 802.11h is only inside one Access Point (AP) or one AP and mobile stations (also referred to herein as mobiles, mobile nodes, mobile devices or stations) under that AP.

If a present AP is suffering from interference which is caused by other APs on the same channel and/or the stations under these other APs, the present AP can use CS, but TPC, specified in 802.11h, doesn't work for that present AP on such an occasion. In addition, the 802.11h specification does not contemplate or describe how to select a desired method or that there may be a plurality of proper methods among plural alternatives, such as, e.g., TPC and CS, to reduce such interference.

While a variety of systems and methods are known, there remains a need for improved systems and methods for addressing interference from other APs and/or stations under such other APs.

SUMMARY OF THE PREFERRED
EMBODIMENTS

The preferred embodiments of the present invention can significantly improve upon existing systems and methods.

In the preferred embodiments, a number of methods for the control of transmit power of access point (AP) and for the reduction of interference from other wireless APs and/or STAs are presented. In addition, in some preferred embodiments, novel methods for selecting one interference reduction methods are presented, such as, e.g., for selection among CS and TPC of an AP based on, e.g., one or more predetermined policy, one or more capability of TPC of an AP and/or a STA, and/or current condition of interference, etc.

According to some embodiments, a method for reducing interference in a first wireless network from a second wireless network is performed that includes: at an Interfered AP, which Interfered AP either itself receives interference or has a station in the Interfered AP's network that receives interference from an Interfering AP or from a station within the Interfering AP's network, selecting how to reduce interference from a plurality of interference reduction methods.

In some examples, the method further includes the Interfered AP selecting how to reduce interference on a respective occasion based at least in part on an elimination process. In some examples, the method further includes the Interfered AP selecting how to reduce interference on a respective occasion based at least in part on a) a number of Interfering APs or b) a number of APs or stations receiving interference signals. In some examples, the method further includes the Interfered AP selecting how to reduce interference on a respective occasion based at least in part on a selection policy (such as, e.g., a selection policy that uses load information for selection or a selection policy that uses a received power of an interference signal for selection). In some examples, the received power of an interference signal is used to check whether or not Transmit Power Control works well in the current channel. In some examples, the method includes the Interfered AP initially checking neighborhood channels and if there are any sufficiently vacant channels, changing its channel thereto. In some examples, the method includes the Interfered AP selecting a channel with a minimum load as a candidate channel.

In some examples, the method further includes performing the following steps in the case of Transmit Power Control selection: 1) the Interfering AP inquiring with its stations about their current transmit powers and checking whether a reduction of transmit power is appropriate; and 2) the Interfering AP effecting a reduction of a transmit power and monitoring whether the reduction adversely affects stations in its network.

In some examples, the method further includes the Interfering AP checking the condition of each station in the Interfering APs network and raising a transmit power if it detects that reduction adversely effects a transmission rate of a station.

In some examples, the method further includes that the Interfered AP communicates with the Interfering AP via a backbone network or via an intermediate wireless device (such as, e.g., a mobile station).

In some examples, the method includes that the Interfered AP collects capability information and current status information.

In some examples, the method further includes that the Interfered AP eliminates at least some interference reduction methods, selects candidate methods based on capability information, and, if plural alternative possible candidate methods are available, prioritizes them based on a predetermined policy. In some embodiments, the Interfered AP further decides which interference reduction method the AP should use based at least in part on current status information.

According to yet some other embodiments, a method for reducing interference in a first wireless local area network from a second wireless local area network is performed that includes: at an Interfered AP, which AP itself receives interference or has a station in the Interfered AP's network that receives interference from an Interfering AP or from a station within the Interfering AP's network, selecting a reduction method from a plurality of interference reduction methods, wherein one of the interference reduction methods is transmit power control of the Interfering AP and/or of a station within the Interfering AP's network; and transmitting a request from the Interfered AP to have the Interfering AP perform transmit power control in the case that the Interfered AP selects transmit power control. In some preferred embodiments, the plurality of interference reduction methods includes channel switching or antenna dispersion or direction control.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 4 is a flow diagram illustrating aspects of basic selection flows according to some aspects related to, e.g., step (i) shown in FIG. 1 according to some illustrative and non-limiting embodiments;

FIG. 5 is a flow diagram illustrating aspects of an illustrative advanced selection flow according to some aspects including additional steps to help avoid an endless control loop according to some illustrative and non-limiting embodiments;

FIG. 6 is a flow diagram illustrating aspects of an illustrative selection flow according to some aspects related to Channel Switching and Transmit Power Control according to some illustrative and non-limiting embodiments;

FIG. 7 is a flow diagram illustrating aspects of another illustrative selection flow according to some aspects related to Channel Switching and Transmit Power Control according to some illustrative and non-limiting embodiments;

FIG. 8 is a flow diagram illustrating aspects of an illustrative advanced selection flow according to some aspects related to Channel Switching and Transmit Power Control according to some illustrative and non-limiting embodiments, which also considers load information;

FIG. 9 is a flow diagram illustrating aspects of a first step of Transmit Power Control method according to some illustrative and non-limiting embodiments;

FIG. 10 is an advanced flow diagram illustrating aspects of a first step of Transmit Power Control method according to some illustrative and non-limiting embodiments;

FIG. 11 is a flow diagram illustrating aspects of a second step of Transmit Power Control method according to some illustrative and non-limiting embodiments;

FIG. 12 is a diagram showing message exchanges and processes according to illustrating aspects of a Transmit Power Control method related to TPC request and TCP report (e.g., steps (ii) and (v) shown in FIG. 1) according to some illustrative and non-limiting embodiments;

FIG. 13 is an illustrative architectural diagram showing components of an illustrative Access Point (AP) according to some illustrative and non-limiting embodiments in relation to TPC methodologies; and FIG. 14 is an illustrative architectural diagram showing components of an illustrative station (STA) according to some illustrative and non-limiting embodiments in relation to TPC methodologies.

DETAILED DESCRIPTION OF THE PREFERRED EMBODIMENTS

Figure 1:
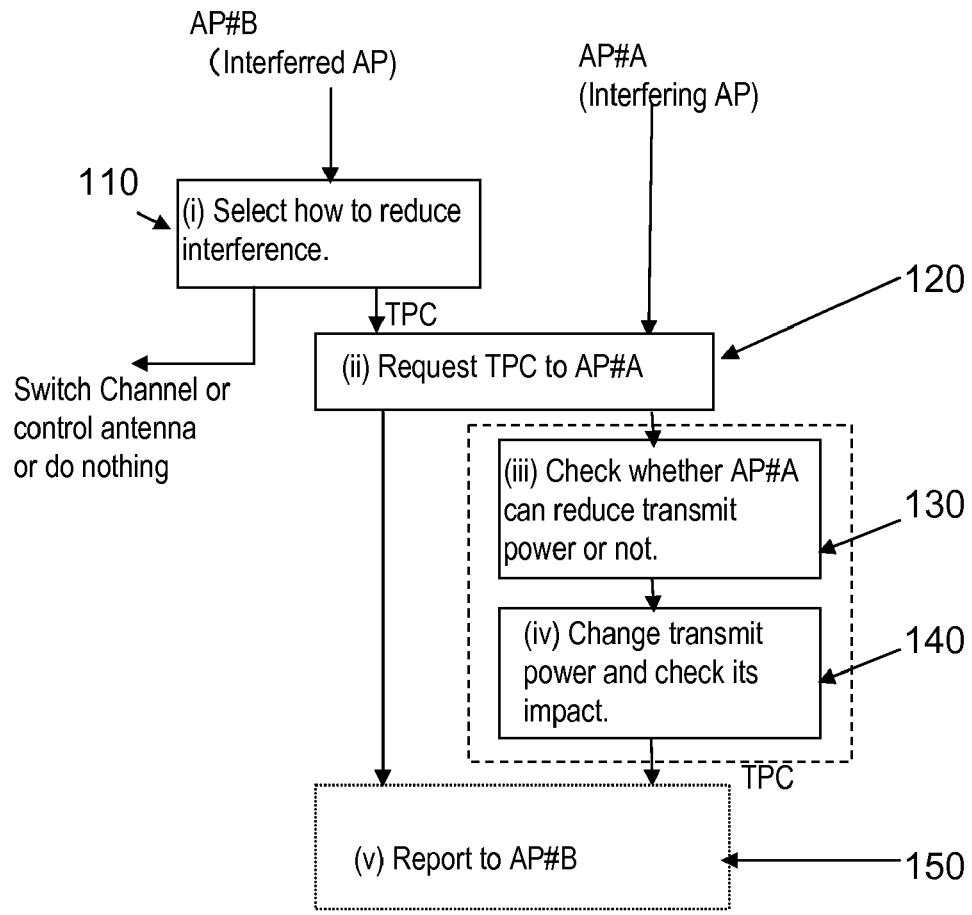
FIG. 1 is a schematic diagram depicting an illustrative overview of a control flow for interference reduction according to some of illustrative embodiments.

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

In the following description, first, we will present certain "pros" and "cons" (i.e., benefits and disadvantages) of both TPC and CS. Next, we will present a "general" overview, including illustrative selection methodology and the methodology related to the following TPC. Next, we will present a series of selection methods under various policies. Next we will present illustrative TPC methods for an AP. In a number of examples, the control method of transmission power of a STA is combined with TPC of an AP as well. In the last section, we will present a number of examples of processes and steps (e.g., using block diagrams) to carry out the presented methodologies.

Pros and Cons of TPC and CS

As indicated above, this section presents some illustrative "Pros" and "Cons" of both TPC and CS. Among other things, as set forth below, it is revealed that the capability of an Access Point (AP) or a Mobile Station (STA) and the current interference occasion will be desired for appropriate selection among, by way of example, TPC and CS.

A. TPC "Pros" (Benefits):
   TPC doesn't need to have all stations under a certain AP move to another channel.
   TPC can result in an AP reducing unnecessary transmission power, resulting in interference reduction to other wireless LANs.
   Even if there are many APs and STAs that are densely located and no good channel exists to switch to, TPC can still reduce interference.

B. TPC "Cons" (Disadvantages):
   To reduce interference given to a certain AP or a certain STA by another wireless LAN AP, a request for TPC needs to be sent to, e.g., the other AP whose transmit power causes the interference.
   To employ TPC, e.g., the interfering AP needs to have the capability of TPC.
   An AP cannot always control its transmission power. TPC will be available only if the condition of the stations (STAs) under the AP, such as their individual received powers, transmission rates, etc., is permitted.
   Even when an interfering AP controls and reduces its transmission power, the result may not always be satisfactory enough to reduce the interference below acceptable level.

A. CS "Pros" (Benefits):
   An AP can reduce interference without requesting TPC from, e.g., another interfering AP.
   It is useful even when interference is too large to reduce sufficiently by TPC.
   It doesn't depend on any prerequisite capabilities of the interfering AP. (such as, e.g., the availability of TPC, etc.).

B. TPC "Cons" (Disadvantages):
   It needs a vacant channel or a usable channel (e.g., even if there are no vacant channels) around the AP.
   If a channel switch is performed, yet another interference may potentially occur.
   Uncertain control architectures, policies or algorithms may initiate an endless loop, because several individual APs may switch channels independently, quickly and frequently.

General Overview

FIG. 1 shows an overview of an illustrative control flow methodology for interference reduction, including selection of reduction methodology and a following procedure of TPC. In this figure, AP#B is an AP with a network component (e.g., whether the AP itself or a station or node within the network) that is suffering from interference (AP#B is also hereinafter referred to as an "Interfered AP"). And, AP#A is an AP which emits a transmit signal and/or which has a station under the AP#A which emits a transmit signal that causes interference to the other network (e.g., resulting in the occurrence of an Interfered AP), such as, e.g., the AP#B network in FIG. 1 (AP#A is also hereinafter referred to as an "Interfering AP").

With reference to FIG. 1, numeral (i) shows the selection process of interference reduction method and numerals (ii) to (v) shows the TPC process. This process is needed only when the AP selects TPC for interference reduction at process (i).

With reference to FIG. 1, at step (i) the interfered AP selects how to reduce interference. In this example, the selection can be to a) switch the channel (e.g., CS), b) control an antenna, c) perform TCP, or the choice can be to do nothing as shown.

At step (ii), the Interfered AP transmits a request for TPC to the Interfering AP.

At step (iii), a check is performed as to whether or not the Interfering AP can reduce is transmit power (this check is performed by the Interfering AP in some embodiments).

At step (iv), the system changes the transmit power and checks its impact (this step is performed by the Interfering AP in some embodiments).

At step (v), the system reports back to the Interfered AP the results of steps (iii) and (iv)(this step is performed by the Interfering AP in some embodiments).

Selection of Interference Reduction Methods (Step i)

Figure 2:
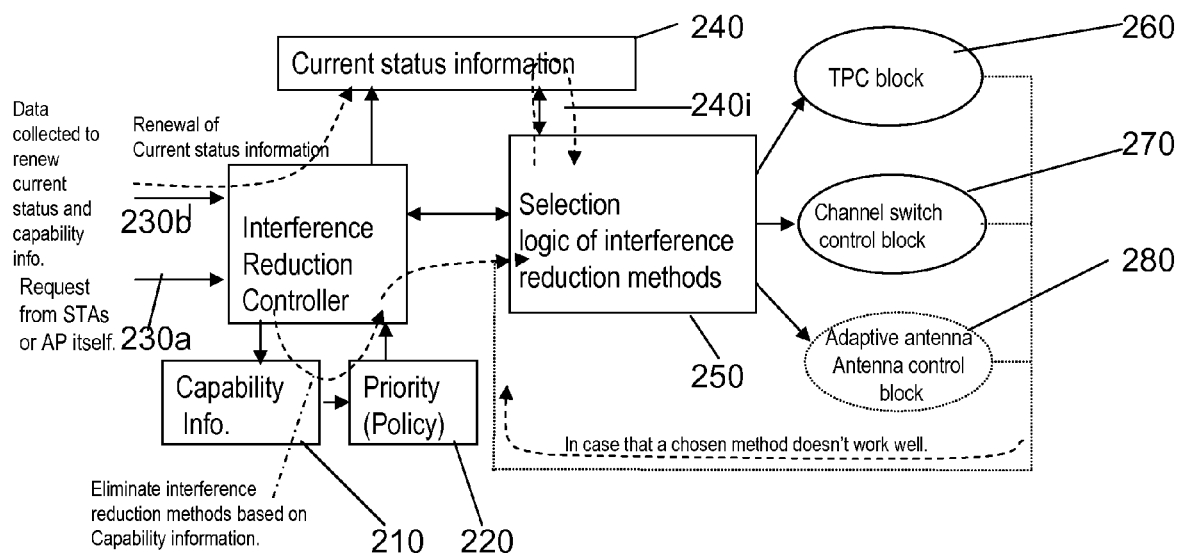
FIG. 2 is a schematic diagram depicting an illustrative block diagram of the structure for performing step (i) shown in FIG. 1 according to some illustrative embodiments.

FIG. 2 shows an illustrative diagram of functionality that can be performed by e.g., an Interfered AP (such as, e.g., via appropriate software, hardware or firmware) for the selection process of interference reduction methods. In the preferred embodiments, the Interfered AP uses this functionality (e.g., software module) when the AP receives a request to have an interference reduction from a station (STA) under the Interfered AP or when the AP itself requires such an interference reduction (see numeral 230a shown in FIG. 2).

With reference to FIG. 2, the Interference Reduction Controller 230 preferably collects and capability information and current status information (see numeral 230b) and, based on this information identifies a policy for decision (see numerals 210 and 220). Among other things, this can be used to eliminate certain interference reduction methods and to select only possible candidates based on capability information and, if plural alternative methods are available, it preferably prioritizes them based on a predetermined policy. The controller 230 preferably sends this prioritized decision to a Selection Logic of Interference Reduction Methods module 250. This selection logic module 250 preferably uses information from the controller 230 and also current status information 240i and determines which interference reduction method the AP should use at that point. In the illustrated embodiment, the selection logic module 250 is depicted as being capable of selecting one or more of the following: TCP control 260; CS control 270; and/or adaptive antenna control 280. As shown in FIG. 2, in the event that a chosen method doesn't work well, the selection logic module can be configured so as to choose another candidate method from the selectable list of methods.

In some illustrative and non-limiting embodiments, capability information and current status information can include at least some or all of the information from the following list. These sets of information, however, do not have to be limited to the items listed below, but can be modified as desired depending on circumstances.

Illustrative Capability Information

In some illustrative and non-limiting embodiments, capability information can include at least some or all of the information from the following list.

Information regarding whether an Interfering AP can deal with TPC requirement or not.

Information regarding whether or not an AP can obtain channel information from other neighborhood APs.

And, optionally, information regarding whether or not an Interfering AP is in a same Extended Service Set (ESS). For reference, an ESS typically involves a number of IEEE 802.11 Basic Service Sets (BSSs) and enables limited mobility within a WLAN in which stations are able to move between BSSs within a single ESS while remaining essentially connected to a fixed network. When a station moves to a new BSS, it carries out a re-association procedure with the new Access Point.

Current Status Information

In some illustrative and non-limiting embodiments, current status information can include at least some or all of the information from the following Table 1.

In this regard, Table 1 shows an illustrative list of current status information to be used for TPC and Channel Switch methodologies, respectively. In Table 1, "possible channel" means other channels except the current channel. In Table 1, the reference x signifies the particular channel number. In various embodiments, this current status information can be acquired using any appropriate techniques; for example, this information can be acquired by using functions defined in the standards or drafts such as 802.11h or 802.11k.

TABLE 1

Current Status Information

| Current status information | TPC | Channel Switch |
|---|---|---|
| Load information of candidate channel x, Lpx | | √ |
| Received power of candidate channel x, Rpx | √ | |
| Transmit power of candidate channel x, Tpx | √ | |
| Load information from current interfering AP, Li | | √ |
| Received power from current interfering AP, Ri | √ | |
| Transmit power of current interfering AP, Ti | √ | |
| Load information of current AP, Lc | | √ |
| Received power of current AP, Rc | √ | |
| Transmit power of current AP, Tc | √ | |
| Elapsed time from last Channel Switch | | √ |
| Elapsed time from last TPC request | √ | |
| Specify STAs (include AP) which receives interference signals & Interfering APs | √ | √ |

TABLE 2

Possible Candidate Methods for Interference Reduction

| | | | # of STAs (include AP) which receives interference signals. | |
|---|---|---|---|---|
| | | | Single | Plural |
| # of Interfering APs | Single AP | Only AP | TPC, CS | TPC, CS |
| | | Both AP & STAs | CS->TPC (*1) | CS->TPC (*1) |
| | Plural APs | Only AP | TPC, CS | TPC, CS |
| | | Both AP & STA | CS->TPC (*1) | CS->TPC (*1) |

With reference to Table 2, the table sets forth possible candidate methods for interference reduction under certain conditions or occasions with regards to the number of Interfering APs and the number of stations (STAs) and APs which receive interference signals (e.g., Interfered APs). In some preferred embodiments, the elimination process shown in FIG. 2 (e.g., carried out via the Interference Reduction Controller 230) can employ a table similar to that in Table 2 to render decision-making. In Table 2, the notation "CS->TPC" means that CS is preferred to TPC in the particular case.

Figure 3:
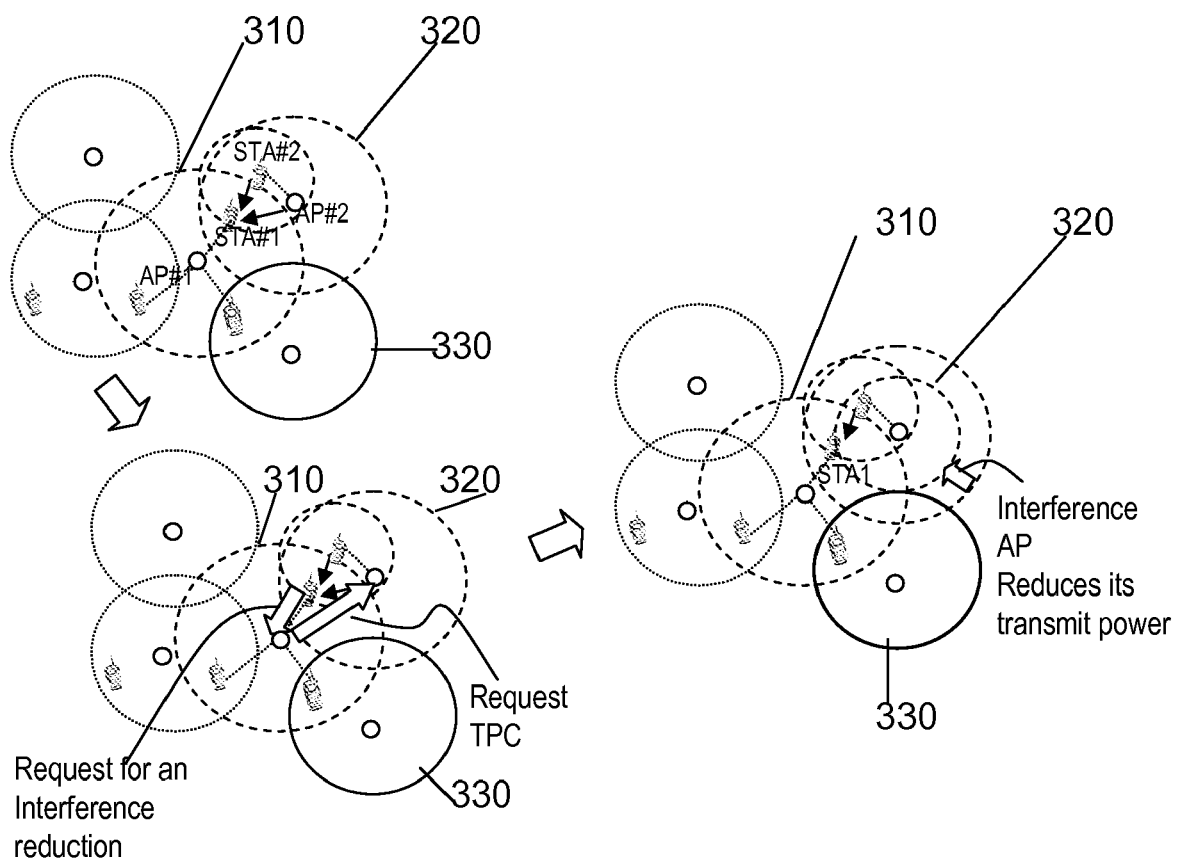
FIG. 3 is a schematic diagram illustrating sequential stages in interference reduction according to some illustrative examples that illustrate that Channel Switching can be more desirable in some contexts.

With reference to FIG. 3, it can be appreciated why CS is preferable in the context of items listed in Table 2 with the notation (*1). For explanatory purposes to facilitate the reader's appreciation, we will assume that the number of available channels is 3 (of course, this is merely one simplified example for the purposes of discussion). In FIG. 3, the dashed circles 310 and 320 illustrate the areas currently served by Channel #1, the solid circles 330 illustrate the areas served by channel #2, and the dotted circles 340 illustrate areas served by channel #3. Here, in some examples, each station can have already finished its TPC to reduce its power consumption with an appropriate method such as, e.g., including any appropriate method shown or described in applicant's co-pending U.S. patent application entitled "Terminal Transmit Power Control with Link Adaptation" filed on Oct. 20, 2004 under Ser. No. 10/968,244, the entire disclosure of which is incorporated herein by reference as though recited herein in full.

In the illustrative and non-limiting example shown in FIG. 3, the STA#1 is shown as associated to AP#1, but as also receiving interference signals from both AP#2 and from STA#2, which is connecting to AP#2. In an illustrative example, STA#1 can be configured to transmit a request for interference reduction to AP#1. Then, as described above, the AP#1 may, depending on circumstances, transmit a request to AP#2 to perform TPC (see, e.g., step (ii) above). In this illustrated example, the AP#2, by way of example, reduces its transmit power with a TPC method (see, e.g., step (iii) above). However, in some instances, the STA#1 may still receive substantially strong interference signal from STA#2. Thus, the TPC method may potentially leave the interference unresolved; accordingly, for this reason, in some embodiments, CS is selected first instead of TPC in the cases identified with a reference (*1) in Table 2.

Next, we will describe some preferred methodologies for choosing one particular method from a plurality of alternative methods of interference reduction. To begin with, we preferably define a selection policy to consider a detailed selection process.

Basically, if an AP finds at least one vacant channel to switch to, the AP only has to select CS and to switch to the vacant channel. However, if an AP doesn't find any vacant channel(s), TPC and CS may still result in potential problems. First, as described above, when an AP changes the channel, the channel switch may result in yet new interferences with other devices that are currently using the new channel. Second, as also described above, when the AP requests TPC to an interfering AP, interference reduction may still potentially not be enough.

From the above observation, in some preferred embodiments, two different selection policies are set forth. As described in further detail below, a first policy (hereinafter "Policy 1") basically uses load information for selection, and a second policy (hereinafter "Policy 2") basically uses received power of interference signal to check whether TPC works well or not in the current channel. These two illustrative selection policies are described in further detail in the following sections.

Policy 1

Reference is now made to FIG. 4 which shows a basic selection flow according to some illustrative embodiments in the performing of step (i) shown in FIG. 1. At a first step 405, the AP preferably checks neighborhood channels. And, if there are any vacant channels around that AP, the AP preferably changes the channel to a vacant channel. In some embodiments, there are two alternative criteria to determine whether a certain channel is vacant. One is that the AP receives beacons of the adjacent AP and knows that $L_{px}$ of that adjacent AP equals 0. (Note: $L_{px}$=load information of candidate channel x: see Table 1 for definition of parameters such as $L_{px}$). In some embodiments, the AP can get $L_{px}$ information of the adjacent AP if the adjacent wireless adopts 802.11e draft standard. The second is that the AP doesn't receive any signals including beacons for a certain time period. A channel in the latter case is more suitable as candidate channel because the potentiality that the channel will be used in the future is low.

In operation, the AP first checks whether it receives any signal or not. If no, it selects CS. If yes, it checks $L_{px}$ value. This process is same in all selection flows in this paper.

Referring to FIG. 4, at step 410 the AP evaluates if $L_{px}$=0, such as, e.g., using methods discussed above. If yes, it selects CS at 410Y. Otherwise, the system selects another channel (e.g., x=x+1) at 420 and checks all possible channels (see steps 430 and 405). If no channels are found in which $L_{px}$=0, the at step 440, the AP selects the channel with minimum load as candidate channel.

Then, at step 450, the AP checks $L_i$ and $L_{px}$. In case that $L_i$ is smaller than $L_{px}$, the AP checks total load "$L_c+L_i$" and if this total load is a substantially heavy load. In FIG. 4, at step 460, 80% is selected as a threshold of a heavy-load situation. This 80% value is provided merely an illustrative and non-limiting example value; this value can be modified, or even controlled, depending on circumstances. Then, at step 470, the AP presumes whether TPC works well or not in the current channel by using the heavy-load threshold. If at step 470, the answer is yes, the AP requests TPC. If at step 470, the answer is no, the AP next presumes at step 480 whether TPC works well or not in the candidate channel. If at step 480, the answer is yes, the AP changes from the current channel to the candidate channel and then requests TPC. Otherwise, it keeps the current conditions. As shown in the lower right side of FIG. 4, generally similar processes are used in case that $L_{px}$ is smaller than $L_i$ (see steps 490 and 495 in FIG. 4).

Although FIG. 4 shows the use of a 9 dB value in the determination of whether TPC will or will not work, this value is merely a non-limiting illustrative example. This illustrative value follows investigation based on numerical simulation. For example, if an AP controls its transmit power employing the TPC method described in the following section entitled "TPC Method for AP" and all stations under that AP stay within about 30 meters from it, an average of its transmit power reduces around 9 dB. Accordingly, in some illustrative embodiments, this 9 dB is chosen as a desirable threshold here.

FIG. 4 shows a basic flow to appropriately select a better interference reduction method considering current load and received power status. However, this flow shown in FIG. 4 doesn't include, for example, some items of current status, and an AP might theoretically be trapped into an endless loop. For example, if an AP decides to request TPC using this depicted flow, but TPC is less effective than originally expected, then the AP needs to do this flow again to reduce interference. Thus, theoretically the AP could potentially get stuck in a loop in which it may decide the same output from this flow and it may, thus, continue the same process in an endless manner.

To avoid such an endless loop, FIG. 5 shows a flow diagram that is generally similar to that shown in FIG. 4 but with the addition of two further items. First, an AP checks "Elapsed time from last TPC request" and avoids doing TPC if this elapsed time isn't long enough. Second, if an AP decides to do CS, the AP checks "Elapsed time from last CS" to avoid entering endless loop.

In particular, as shown in FIG. 5, for the process flows in the context in which $L_{px}$ is larger than $L_i$, at step 510 the system determines if the Interfering AP is the same as in a last time. If the answer is no, the process moves forward to continue in the same manner as shown in FIG. 4. If the answer is yes, then at step 520 the system evaluates the length of the elapsed time from the last TCP request to see if it is greater than a sufficient value y. In addition, FIG. 5 also shows that another modification from that shown in FIG. 4 is that prior to conducting a CS, at a step 530 the system evaluates the length of the elapsed time from the last CS to see if it is greater than a sufficient value z. Similarly, for process flows in the context in which $L_{px}$ is smaller than $L_i$ generally similar processes are conducted, as shown at steps 540, 550 and 560 shown in FIG. 5.

With reference now to FIG. 6, this figure shows a flow chart in an illustrative CS->TPC case. In this case, the system tries CS as long as the total load is under a threshold (such as, e.g., 80% shown in this illustrative and non-limiting example). At step 610, if a total load Lpx+Lc is determined to be more than the threshold, an AP next checks at step 630 which channel TPC can be more effective in. This depends on, e.g., the number of Interference APs as well as number of interference receiving stations (STAs).

As an alternative process, if the AP can check and know that source of interference is only APs and not STAs in the candidate channel, in some embodiments, it is better to do CS. In the flow shown in FIG. 6, a total load Li+Lc is also checked at step 620, as an optional embodiment. As shown, if Li+Lc is less than a threshold, then TPC is selected.

Policy 2

With reference to FIG. 7, a basic selection flow according to the second policy, Policy 2, is depicted. In these exemplary embodiments, if an AP doesn't find any vacant channels (e.g., following steps 410, 420 and 430), at step 710, the AP monitors the received power from interfering AP (or stations) $R_i$ to estimate whether TPC will work well or not in the current channel. In case that TPC is not estimated to reduce the interference sufficiently, then at step 720, the AP switches to the channel with minimum interference signal power to be received at the AP. The system then proceeds to step 730 which is similar to step 480 described above.

FIG. 8 shows an alternative advanced flow of this second policy, which also considers load information. In such a case, even if TPC is not estimated to reduce the interference sufficiently, the AP stays in the current channel if total load, Li+Lc, isn't heavy. In particular, as shown at step 810, if Li+Lc is less than a threshold, then the system stays in the current channel. In addition, as shown at step 820, if Lpx+Lc is above a threshold, then the system stays in the current channel or, otherwise, only performs CS.

TPC Methods for AP (Steps (iii) & (iv))

This section describes, among other things, illustrative examples of TPC methods related to steps (iii) and (iv) discussed above with reference to FIG. 1 pertaining to, in step (iii), checking whether or not an AP can reduce transmit power and, in step (iv), changing transmit power and checking its impact.

This section introduces TPC methods for an AP considering TPC methods for a STA. In the preferred embodiments, as discussed above, when an AP receives a request for TPC, the AP will perform two procedural steps. In some embodiments, the first step, step (iii), includes inquiring with stations (STAs) under that AP about their current transmit powers and checking whether or not each respective STA can reduce its transmit power. In some embodiments, the second step, step (iv), includes changing the transmit power and following-up.

With reference to the flow diagram shown in FIG. 9, in carrying out step (iii), in some embodiments, the AP#A (i.e., the Interfering AP) receives a request for TPC as shown at 901 in FIG. 9. The AP#A then transmits transmission power information requests to stations under that AP#A, such as, e.g., shown at 902 and 903 in the illustrated example. Next, as shown at step 910, the AP preferably checks the path loss condition of each STA by calculating the path loss for each station, such as, e.g., using the formula Path loss$_{si}$=Tx power$_{si}$−Rx Power$_{si}$ as shown.

In the basic flow shown in FIG. 9, in the preferred embodiments, the AP seeks to adjust its transmit power so that the STA which has the maximum path loss among all of the STAs can transmit with the maximum transmission rate, considering appropriate margins. Thus, at step 920, the AP calculates a value α, which is the sufficient transmission power to serve the STA with the maximum path loss to the maximum transmission rate. If α is less than Basic Tx power, then the AP adjusts its transmission power to α.

In some cases, a wireless LAN might cover some applications which do not need to send communications with a maximum rate (such as, e.g., Voice over IP (VoIP) and other applications). In this regard, FIG. 10 shows a diagram that is similar to that depicted in FIG. 9, but which considers such applications and, thus, the required transmission rates for each station. In such a case, the AP, thus, needs to know the respective path loss for each station, and not only the maximum of the path losses among all of the STAs.

In various embodiments, there are a number of alternative methods for the AP knowing the required transmission rates for each station. One methodology is that either an action frame or another control frame is used to request the information regarding the required transmission, and the STA responds to the request. Another methodology is that the traffic or QoS information for every STA held in a QoS function such as, e.g., related to 802.11e in the AP is used to identify the required transmission rate.

In the embodiment shown in FIG. 10, at step 1010, the AP calculates the path loss for each station. Next, at step 1020, the AP checks the required rate for each STA—based on its application—and chooses a sensitivity for the STA sensitivity. Then, at step 1030, the AP chooses the maximum value of Path Loss$_i$+Sensitivity$_i$. And, next, at 1040 the AP calculates a value for α in a manner similar to step 920 shown in FIG. 9. And, once again, if α is less than Basic Tx power, then the AP adjusts its transmission power to α.

With reference to step (iv), the AP also checks each station's condition and raises its transmit power if it detects that TPC of the AP affects the transmission rate of STAs in unexpected manner. FIG. 11 sets forth an illustrative example for carrying out this step. In this regard, the following methodology can be employed to check whether or not TPC at the AP potentially adversely effects one or more of the stations.

Step A: The AP checks the transmit rate of each STA, and if any STA reduces the rate rapidly after TPC at the AP side (such as, e.g., reducing a rate more than 2 levels), the AP judges that the TPC adversely effects that STA.

Step B: If the AP detects that several consecutive transmissions it sends to a specific STA experiences failure, the AP judges that TPC adversely effects that STA and raises its transmit power.

During normal operations, the path loss between the AP and the STA may vary. Moreover, TPC of STA may reduce the transmit power of STA. These changes would require another TPC of AP. The periodic monitoring of the transmission power of a STA and the received power of the signal from the STA is one way to check the necessity of TPC of an AP. Another method to trigger the TPC of an AP involves that a STA sends a notification of change of its transmission power to AP.

With reference to FIG. 11, in this illustrated example, a flow chart of the second step (step (iv)) of the TPC method of an AP according to some embodiments can include the following steps. First, at a step 1110, the AP#A (i.e., the Interfering AP) adjusts its transmit power based on calculation in the first step (i.e., step (iii)). Next, at step 1120, the AP#A sends beacons or other signals to its stations (STAs). Then, as shown at 1130, link adaptation and TPC may occur at the STAs. Thereafter, at step 1140, the AP#A determines whether or not the TPC at the AP side adversely affects some of the STAs. If not, the system continues in the present state. If so, the system raises the Tx power at the step 1150.

Next, we show two alternatives of requesting TPC to an Interfering AP. As indicated above, if both APs are in the same ESS, they can communicate with each other via a backbone network such as, e.g., a distribution system (DS) in an 802.11 standard and an AP can request TPC to the other AP using the DS.

However, if both APs are not in an ESS, they cannot directly communicate with each other via DS. Accordingly, in such cases, some additional methodology is needed. FIG. 12 shows one illustrative and non-limiting method to communicate with the Interfering AP. In this example, the figure shows a case in which a station STA#1 requests TPC to an Access Point AP#1. In this case, the AP#1 asks the STA#1 to send TPC request signal to an interfering AP after it decides to request TPC for interference reduction. The STA#1 disconnects from the AP#1 and connects to the interfering AP and requests TPC. When the STA#1 tries to connect the interfering AP, the Probe request signal from the STA#1 preferably includes these two notifications: (1) that the STA#1 is communicating "for requesting TPC" and (2) that the STA#1 "is under AP#1." If the Interfering AP knows in advance that AP#1 is in the neighborhood, it preferably does TPC.

In particular, in the illustrative example shown in FIG. 12, at a first step 1210 the STA#1 sends a request for interference reduction to the AP#1. Then, at step 1220, the AP#1 determines whether to request TPC to the Interfering AP. Then, upon a positive determination, at step 1230 the AP#1 sends a request to the STA#1 to send a TPC request signal to AP#A. Next, the STA#1 initiates a communication with the AP#A at step 1240, and, as shown at step 1250, the STA#1 goes through any required association and authentication process with the Interfering AP#A. Then, at step 1260 the STA#1 transmits a probe request and action signal, including the TPC request signal from AP#1. Then, the Interfering AP decides at step 1270 whether or not to perform TPC. Then, at step 1280 the Interfering AP#A sends a signal to STA#1 informing the STA#1 whether or not AP#A has executed TPC. Then, the STA#1 transmits this information in turn to the AP#1 at step 1290.

Exemplary Diagrams of Illustrative APs and STAs

FIGS. 13 and 14 show exemplary block diagrams of an AP and an STA, respectively. These figures includes some functional blocks for interference reduction and TPC. In these figures, the functional blocks that are highlighted in bold (i.e., having thicker perimeter lines) are blocks that are modified or added to implement new functions of the AP and STA in accordance with the preferred embodiments herein. In addition, in FIGS. 13 and 14, characters shown in italics represent information to be sent between blocks for new functions. While FIGS. 13 and 14 show some illustrative embodiments, it should be appreciated based on this disclosure that a variety of modifications and variations can be made. As one illustrative other configuration, by way of example, the "TPC controller" could be included in the "Interference controller" in some examples.

With respect to the architectural diagram of the AP shown in FIG. 13, in operation, at first TPC controller 1310 checks whether stations under that AP do their TPC, respectively. If "Yes" or "not clear," the TPC controller sends transmit power information request signal 1320s to Tx state machine via module 1320, and this signal is sent to each station. If the answer is "No," the AP doesn't need to execute this step. Then, the TPC controller calculates reduced power via module 1330 and controls PA 1340. In the illustrated embodiment, the interference controller works when the AP receives requirements from stations or from the AP itself. In some embodiments, this controller decides the method to use for interference reduction and sends control signals to each controller. For example, as shown in FIG. 13, interference controller sends control signal to the TPC controller, and then TPC controller starts TPC control.

With reference to FIG. 13, in this illustrative example, it is seen that the SW/BPF 1310 forwards received signals to RF transceiver 1320. In the RF transceiver 1320, the receive radio 1325 forwards received data to the BB physical layer 1330. The BB physical layer 1330 includes, among other things, a demodulator 1331, which receives data from receive radio 1325. Demodulator 1331 transmits signals to MAC 1340 and clear channel assessment CCA 1333. The CCA 1333 provides signals which are used to control receive radio 1325. CCA also transmits signals to CCA 1341 in MAC 1340. Signals from CCA 1341 and demodulator 1331 are received by Rx State Machine 1342 and transmitted to PCI bus 1350. From the PCI bus 1350, the system may exchange data with any of host CPU 1360, host memory 1370, and Interference Controller 1380. Tx State Machine 1343 in MAC 1340 receives data from PCI bus 1350 and CCA 1912, and transmitted to modulator 1332 in BB physical layer 1330. Information may be exchanged between modulator 1331 and CCA 1333. Modulator 1332 that outputs data to transmit radio 1326 in RF transceiver 1330. PA 1321 then receives control signals from TPC controller 1345 and signals from transmit radio 1326 and sends them to SW/BPF 1310 for transmission.

With respect to the architectural diagram of the station shown in FIG. 14, in operation, if the station receives a transmit power information request from an AP, the station includes the information of its current transmit power to a transmit signal. Other blocks or signals are for TPC of station, and these mechanisms can be the same as set forth in applicants' co-pending U.S. patent application entitled "Terminal Transmit Power Control with Link Adaptation" filed on Oct. 20, 2004 under Ser. No. 10/968,244, the entire disclosure of which is incorporated herein by reference as though recited herein in full.

With reference to FIG. 14, in this illustrative example, it is seen that the SW/BPF 1410 forwards received signals to RF transceiver 1420. In the RF transceiver 1420, the receive radio 1425 forwards received data to the BB physical layer 1430. The BB physical layer 1430 includes, among other things, a demodulator 1431, which receives data from receive radio 1425. Demodulator 1431 transmits signals to MAC 1440 and clear channel assessment CCA 1433. The CCA 1433 provides signals which are used to control receive radio 1425. The CCA also transmits signals to CCA 1441 in MAC 1440. Signals from CCA 1441 and demodulator 1431 are received by Rx State Machine 1442 and transmitted to PCI bus 1450. From the PCI bus 1450, the system may exchange data with any of host CPU 1460, host memory 1470, and Interference Controller 1480. Tx State Machine 1443 in MAC 1440 receives data from PCI bus 1450 and CCA 1912, and transmitted to modulator 1432 in BB physical layer 1430. Information may be exchanged between modulator 1431 and CCA 1433. Modulator 1432 that outputs data to transmit radio 1426 in RF transceiver 1430. PA 1421 then receives control signals from TPC controller 1445 and signals from transmit radio 1426 and sends them to SW/BPF 1410 for transmission.

BROAD SCOPE OF THE INVENTION

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method for reducing interference in a first wireless network from a second wireless network, comprising: at an Interfered AP, which Interfered AP either itself receives interference or has a station in the Interfered AP's network that receives interference from an Interfering AP or from a station within the Interfering AP's network, said Interfered AP selecting a method to reduce interference from a plurality of interference reduction methods.

2. The method of claim 1, further including said Interfered AP selecting how to reduce interference on a respective occasion based at least in part on an elimination process.

3. The method of claim 2, further including said Interfered AP selecting how to reduce interference on a respective occasion based at least in part on a) a number of Interfering APs or b) a number of APs or stations receiving interference signals.

4. The method of claim 1, further including said Interfered AP selecting how to reduce interference on a respective occasion based at least in part on a selection policy.

5. The method of claim 4, further including said Interfered AP selecting how to reduce interference on a respective occasion based at least in part on a selection policy that uses load information for selection.

6. The method of claim 4, further including said Interfered AP selecting how to reduce interference on a respective occasion based at least in part on a selection policy that uses a received power of an interference signal for selection.

7. The method of claim 1, further including said Interfered AP initially checking neighborhood channels and if there are any sufficiently vacant channels, changing its channel thereto.

8. The method of claim 1, further including said Interfered AP selecting a channel with a minimum load as a candidate channel.

9. The method of claim 1, further including said Interfered AP evaluating whether or not Transmit Power Control works well in a current channel by using a heavy-load threshold.

10. The method of claim 8, further including said Interfered AP evaluating whether or not Transmit Power Control works well in a candidate channel.

11. The method of claim 1, further including performing the following steps in the case of Transmit Power Control selection: 1) the Interfering AP inquiring with its stations about their current transmit powers and checking whether a reduction of transmit power is appropriate; and 2) the Interfering AP effecting a reduction of a transmit power and monitoring whether the reduction adversely affects stations in its network.

12. The method of claim 1, further including performing the following steps in the case of Transmit Power Control selection: the Interfering AP checks the path loss condition of each station in its network and adjusts transmit power such that the station which has the maximum path loss can transmit with a certain appropriate transmission rate.

13. The method of claim 1, further including the Interfering AP checking the condition of each station in the Interfering APs network and raising a transmit power if it detects that reduction adversely effects a transmission rate of a station.

14. The method of claim 1, wherein to initiate Transmit Power Control, the Interfered AP sends a request for Transmit Power Control to the Interfering AP via another device capable of communicating with the Interfering AP.

15. The method of claim 1, wherein the Interfered AP communicates with the Interfering AP via a backbone network or via an intermediate wireless device.

16. The method of claim 1, wherein said Interfered AP collects capability information and current status information.

17. The method of claim 1, wherein said Interfered AP eliminates at least some interference reduction methods, selects candidate methods based on capability information, and, if plural alternative possible candidate methods are available, prioritizes them based on a predetermined policy.

18. A method for reducing interference in a first wireless local area network from a second wireless local area network, comprising:
  a) at an Interfered AP, which AP itself receives interference or has a station in the Interfered AP's network that receives interference from an Interfering AP or from a station within the Interfering AP's network, selecting a reduction method from a plurality of interference reduction methods, wherein one of said interference reduction methods is transmit power control of the Interfering AP and/or of a station within the Interfering AP's network;
  b) transmitting a request from the Interfered AP to have the Interfering AP perform transmit power control in the case that the Interfered AP selects transmit power control.

19. The method of claim 18, wherein said plurality of interference reduction methods includes channel switching or antenna dispersion or direction control.

20. The method of claim 18, further including having said Interfering AP check whether it can reduce a transmit power.

* * * * *

UNITED STATES PATENT AND TRADEMARK OFFICE
CERTIFICATE OF CORRECTION

PATENT NO. : 7,653,357 B2  
APPLICATION NO. : 11/419625  
DATED : January 26, 2010  
INVENTOR(S) : Matsuo et al.

Page 1 of 1

It is certified that error appears in the above-identified patent and that said Letters Patent is hereby corrected as shown below:

In the Specification

In Column 15, Line 36, delete "controller 1310" and insert -- controller 1345 --, therefor.

In Column 15, Line 43, delete "PA 1340." and insert -- PA 1321. --, therefor.

In Column 16, Line 1, delete "modulator 1331" and insert -- modulator 1332 --, therefor.

In Column 16, Line 34, delete "modulator 1431" and insert -- modulator 1432 --, therefor.

In Column 16, Line 36, delete "RF transceiver 1430." and insert -- RF transceiver 1420. --, therefor.

Signed and Sealed this  
Twentieth Day of January, 2015

Michelle K. Lee  
*Deputy Director of the United States Patent and Trademark Office*